United States Patent [19]

Moyne

[11] 3,897,448

[45] July 29, 1975

[54] PROCESS FOR THE MANUFACTURE OF ALKYL BENZIMIDAZOLYLCARBAMATES

[75] Inventor: Jose Moyne, Claurie, France

[73] Assignee: Rhone-Progil, Courbevoie, France

[22] Filed: Oct. 30, 1973

[21] Appl. No.: 411,023

[30] Foreign Application Priority Data
Nov. 30, 1972 France .............................. 72.43306

[52] U.S. Cl. ............................................. 260/309.2
[51] Int. Cl. ............................................ C07d 233/66
[58] Field of Search ................................. 260/309.2

[56] References Cited
UNITED STATES PATENTS
3,723,505  3/1973  Schlatter, et al. ................ 260/482 C Primary Examiner—Henry R. Jiles
Assistant Examiner—C. M. S. Jaisle
Attorney, Agent, or Firm—Browdy and Neimark

[57] ABSTRACT

Alkyl benzimidazolyl-carbamate is obtained by reacting alkyl chloroformate with cyanamide in an aqueous medium at pH 6–13, acidifying the resultant aqueous alkyl cyanocarbamate, extracting such cyanocarbamate with an organic water-immiscible solvent, and then reacting the alkyl cyanocarbamate in organic solution with an orthophenylene diamine in the presence of at least one mole of acid for each mole of orthophenylene diamine.

3 Claims, No Drawings

PROCESS FOR THE MANUFACTURE OF ALKYL BENZIMIDAZOLYLCARBAMATES

FIELD OF INVENTION

The present invention relates to a process for the manufacture of alkyl benzimidazolyl-carbamates by reacting an alkyl chloroformate with cyanamide, then reacting the resultant alkyl cyanocarbamate with orthophenylene diamine.

BACKGROUND

It is known to react an alkyl chloroformate with cyanamide or a salt thereof in an alkaline medium to obtain an alkyl cyanocarbamate (German Pat. No. 247,453 of Aug. 10, 1911). It is also known to react an alkyl cyanocarbamate with an orthophenylene diamide in an aqueous acidic medium to obtain an alkyl benzimidazolylcarbamate (French Pat. No. 1,544,474). Further, it has been shown that this latter reaction can be carried out in some water-miscible solvents and in mixtures thereof with water (French Pat. of addition No. 69.38 290 to French Pat. No. 1,544,474).

The process of manufacturing benzimidazolylcarbamates which consists simply of the two above-described stages in sequence, in particular by keeping the same reaction medium, has the advantage of simplicity. But such process does present some disadvantages. Thus, the quality of the resultant product using these conditions is not good. The industrial filtration of the benzimidazolylcarbamate presents difficulties, since the particle size is very small. Moreover, the product contains numerous impurities due largely to the quality of cyanamide available on the market, and only complicated and onerous processes provide a pure product.

Another drawback arises when the reaction medium is water or a mixture of water and water-miscible solvents. Indeed, if such solvents are not troublesome in the first stage of the process, in the second stage they present a chief drawback to the process because they lead to a mixture of such solvents with low quantities of orthophenylene diamine. This latter product is particularly toxic and the waters containing it cannot be simply discarded. It is, accordingly, necessary to carry out a distillation to recover pure water and solvents and a residue containing the toxic product, which can be burnt. It is obvioius that the distillation of great quantities of water is a very expensive operation which unduly burdens the process cost.

SUMMARY

It is, accordingly, an object of the present invention to provide a technique which obviates the drawbacks of the prior art, such as indicated above.

It is another object to provide for the improved preparation of alkyl benzimidazolyl-carbamate.

The invention relates to a process of manufacturing alkyl benzimidazolyl-carbamate by reacting an alkyl chloroformate with cyanamide or a salt thereof in an aqueous medium at pH between 6 and 13, and by then reacting the so-obtained alkyl cyanocarbamate with an orthophenylene diamine in the presence of a molar quantity of acid which is at least equal to the molar quantity of orthophenylene diamide, characterized in that the alkyl cyanocarbamate obtained in the first stage reaction is acidified and is then extracted off from the aqueous medium with an organic water-immiscible solvent, and is then reacted in such solvent with the orthophenylene diamine to effect the second stage reaction.

The use of an organic water-immiscible solvent solves the above-mentioned problems. Indeed, the second stage of the process is carried out in the presence of only small quantities of impurities, these impurities having remained for the most part in the aqueous medium of the first stage reaction of chloroformate with cyanamide. This result cannot be achieved if water-miscible solvents, such as methanol, are used for the second stage of the process. On the other hand, at the end of the second stage reaction, an organic solvent which contains orthophenylene diamine remains, the distillation of which is much easier and not nearly so expensive as the distillation of water. Moreover, a great number of impurities having previously been removed, it is possible to re-use the organic solvent several times before a total removal of the orthophenylene diamine by distillation becomes necessary.

DETAILED DESCRIPTION

The main characteristics of the process are hereinafter described, without limiting the scope of the invention to the precisely defined workings.

The raw materials used in the process according to the invention are products well-known by the man skilled in the art; these are generally defined below:

By "alkyl chloroformate", what is meant is a product of the general formula:

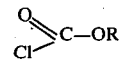

in which R is an alkyl group with 1 to 4 carbon atoms.

By "cyanamide salts", what is meant are the alkali or alkaline-earth metal salts, such as sodium, potassium, calcium, magnesium, of cyanimide. Generally commercial calcium cyanamide is preferably used.

By "orthophenylene diamine" what is meant is a compound having the general formula:

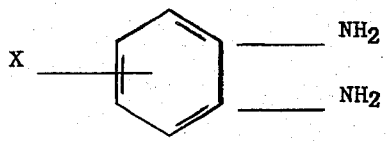

in which X is hydrogen, halogen, a nitro group or an alkyl group containing 1 to 4 carbon atoms.

The first stage of the process consists in reacting an alkyl chloroformate with cyanamide or a salt thereof. This operation is well known in itself. It is carried on in water, at a temperature preferably between 0° and 105° C, but such temperature is not a critical feature of the reaction. On the other hand, imperatively the pH of the reaction mixture must be kept higher than 6, preferably between 7 and 13. Reaction times between a few minutes and several hours are common.

When the first stage reaction has ended, there results a solution of a salt of alkyl cyanocarbamate in water containing solid impurities. There impurities can be present in large quantity, especially if commercial calcium cyanamide has been used. According to previous processes, it is necessary at this moment to effect the filtration of these impurities. But this operation has drawbacks. On account of the physical nature of the filter cake, a large quantity of cyanocarbamate salt is retained in the solid particles, which salt cannot be recovered by washing. Only a re-dispersal, followed by mixing and another filtration permits the recovery of the physically bound cyanocarbamate salt. It is obvious that the product cost is considerably increased by such prior procedures, particularly on account of dilutions which require an increase of the apparatus size. On the other hand, if this part of cyanocarbamate is not desired to be recovered, it is impossible to merely throw away the wastes, containing especially calcium chloride and lime, for they then also contain cyanocarbamate, the toxicity of which prohibits it from being merely thrown back to the waste-pipe.

According to the process of the present invention, the aqueous solution of raw cyanocarbamate salt is first acidified so as to turn the cyanocarbamate salt into free cyanocarbamate which will be soluble in the organic water-immiscible solvent. This operation can be realized by the use of any organic or inorganic acid such as hydrogen chloride or acetic acid. It is preferable to provide a pH between 2 and 5, preferably between 3 and 4, which provides more satisfactory results.

The cyanocarbamate is then extracted, for instance counter-currently, from the aqueous acidified solution, containing the solid impurities, with an organic water-immiscible solvent. This extraction provides, after decantation, on one hand an organic solution of the whole cyanocarbamate, and on the other hand, an aqueous suspension containing only products which can be thrown away as they are to be waste-pipe.

By "organic water-immiscible solvent" what is meant is any organic solvent the solubility in water of which is not greater than 5 %, preferably 3 %. It has, however, been established that, among this class, some compounds are more particularly suitable for the working of the invention. Among them are particularly noted the higher alcohols containing more than 5 carbon atoms, such as hexanol, heptanol, etc.; heavy ketones such as diisobutylketone, methylisobutylketone, etc.; esters such as butyl acetate, etc.; chlorinated solvents such as dichloroethane, perchloroethylene, and other chlorinated hydrocarbons; and some other usual solvents such as benzonitrile, nitrobenzene.

The second stage reaction of the process then consists in reacting orthophenylene-diamine with the alkyl cyanocarbamate in solution in the organic water-immiscible solvent as it comes from the extraction operation. This second stage reaction must be carried out in the presence of an acid, the molar quantity of acid to be introduced being at least equal to the molar quantity of orthophenylene diamine used, every mole of this acid giving one mole of ammonia during condensation. The acid must be chosen among the acids which can be handled in the absence of water. In this category, there can be mentioned organic acids such as formic and acetic, and inorganic acids such as phosphoric and sulfuric. However, gaseous hydrogen chloride is particularly suitable for the present invention. According to a possibility within the scope of the invention, orthophenylene diamine can be introduced in the form of hydrochlorate, the necessary quantity of acid being in this case decreased by the quantity of hydrogen chloride present in the form of hydrochlorate.

A quantity of orthophenylene diamine which corresponds to the stoechiometry of the condensation reaction with cyanocarbamate is generally used. The mixture is heated to a temperature between 60°C and the boiling point of the solvent, for 1 to 10 hours.

After cooling, a precipitate of alkyl benzimidazolylcarbamate is easily isolated by usual means such as filtration or decantation. It must be noted that filtration is very easy for the crystals are large-sized; on the other hand, filtration is not easy in the previous processes, and in fact is very difficult on account of the small size of the particles produced by such prior processes. Moreover analysis of crystals resulting in the present process makes it clear that they are made of practically pure alkyl benzimidazolylcarbamate.

The hereinafter examples illustrate the invention without, however, limiting it to the described condition, particularly with respect to the used solvents.

EXAMPLE 1

In a first stage, methyl cyanocarbamate is prepared by reaction between methyl chloroformate and cyanamide. For this, 75.6 g. of methyl chloroformate (0.8 M) are added to 80 g of calcium cyanamide at 50 % (0.5M) in suspension in 300 ml of water, for half an hour, at a temperature slightly below 40°C. After 1 hour of reaction, the solution is acidified by 50 ml of chlorhydric acid at 37 %.

The cyanocarbamate is then extracted from the aqueous medium with 300 ml of benzonitrile. After decantation and separation of the aqueous phase, there are added 50 g of acetic acid and 48.6 g of orthophenylene diamine to the organic water-immiscible solvent phase. The reaction mixture is heated for 2 hours to 100°C, then cooled and filtered. The obtained precipitate is pure methyl benzimidazolylcarbamate and has a weight of 69 g (yield : 80 % related to the diamine).

EXAMPLE 2

The procedure of example 1, is repeated but the organic water-immiscible solvent is hexanol and the acid is gaseous hydrogen chloride. Under these conditions the reaction, carried out at 130°C for 2 hours, produces 64.5 g of pure methyl benzimidazolylcarbamate (yield : 75 % related to the diamine).

EXAMPLE 3

The procedure of example 1, is again repeated but the organic water-immiscible solvent is diisobutylketone, and the acid is formic acid. Under these conditions the reaction, carried out at 100°C for 5 hours, produces 51 g of pure methyl benzimidazolylcarbamate (yield : 60 % related to the diamine).

It will be obvious to those skilled in the art that various changes may be made without departing from the scope of the invention and the invention is not to be considered limited to what is described in the specification.

What is claimed is:

1. In a process for the manufacture of alkyl benzimidazolylcarbamate by first stage reaction of an alkyl chloroformate, with the alkyl having 1–4 carbons, with cyanamide or an alkali or alkaline earth metal or magnesium salt thereof in an aqueous medium at a pH between 6 and 13, and then by second stage reaction of the obtained alkylcyanocarbamate with an orthophenylenediamine substituted by H, halogen, $NO_2$ or alkyl of 1–4 carbons in the presence of a molar quantity of acid at at least equal to the molar quantity of diamine, the improvement wherein the alkyl cyanocarbamate medium from said first stage reaction is first acidified and then the alkylcyanocarbamate is extracted from the aqueous acidified medium with an organic water-immiscible solvent, and then said alkylcyanocarbamate is reacted in this same solvent with the orthophenylene diamine to provide said second stage reaction.

2. A process according to claim 1, wherein said organic water-immiscible solvent is higher alcohol having more than 5 carbon atoms, methylisobutylketone, diisobutylketone, butyl acetate, a chlorinated hydrocarbon, benzonitrile or nitrobenzene.

3. A process according to claim 2 wherein said organic water-immiscible solvent is hexanol, heptanol, diisobutylketone, methylisobutylketone, butyl acetate, dichloroethane, perchloroethylene, benzonitrile or nitrobenzene.

UNITED STATES PATENT OFFICE
CERTIFICATE OF CORRECTION

PATENT NO. : 3,897,448
DATED : July 29, 1975
INVENTOR(S) : Jose MOYNE

It is certified that error appears in the above-identified patent and that said Letters Patent are hereby corrected as shown below:

Column 6, claim 2, line 2, insert --a-- before "higher"

Signed and Sealed this eighteenth Day of November 1975

[SEAL]

Attest:

RUTH C. MASON
Attesting Officer

C. MARSHALL DANN
Commissioner of Patents and Trademarks